United States Patent Office 3,167,650
Patented Jan. 26, 1965

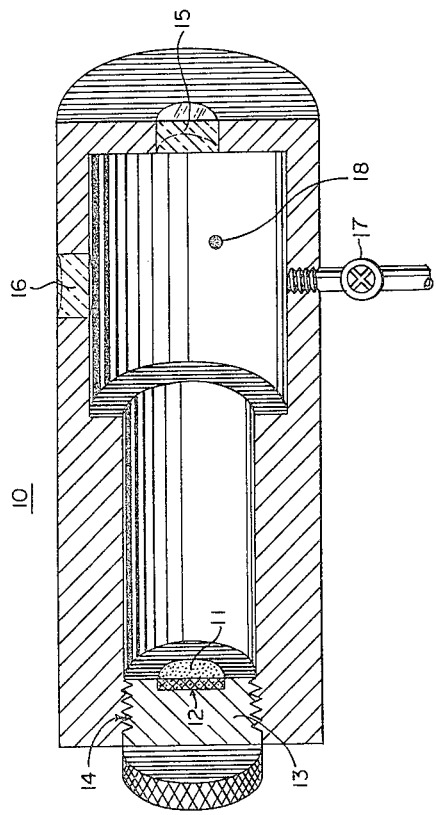

3,167,650
PORTABLE ULTRAVIOLET SOURCE PRODUCED BY A RADIOACTIVE SOURCE MATERIAL
Randolph G. Taylor, 7611 12th St. NW.,
Washington, D.C.
Filed Sept. 11, 1962, Ser. No. 222,982
4 Claims. (Cl. 250—84)
(Granted under Title 35, U.S. Code (1952), sec. 266)

The invention described herein may be manufactured and used by or for the Government of the United States of America for governmental purposes without the payment of any royalties thereon or therefor.

The present invention is directed to a stable, portable ultraviolet source and more particularly to an ultraviolet source which operates without electrical power.

Heretofore ultraviolet lamps have been powered by a direct current power supply for tubes having electrodes and by microwave generators for electrodeless lamps. These lamps require large cumbersome power supplies, or in the case of battery operated sources, the batteries need recharging or replacing after short times. At times under certain conditions, even batteries are too heavy as a power source for portable equipment and other ultraviolet sources are desired.

It is therefore an object of the present invention to provide a portable ultraviolet source which does not require an electrical power source.

Another object is to provide a portable, continuous, constant, ultraviolet output for long periods of time.

Still another object is to provide an ultraviolet source for field use as well as other uses.

Other objects, advantages and features of the invention should become apparent from the following detailed description which is taken in conjunction with the accompanying drawing in which:

The drawing is a cross sectional view of the device in elevation.

The present invention is directed to a stable, portable, lightweight, constant output ultraviolet lamp of simple construction. The ultraviolet lamp comprises an evacuated housing within which a source of radioactive material that emits a source of X-rays, pure alpha radiation, or pure beta radiation, has been placed at one end. The housing is filled with a suitable gas such as helium, hydrogen, krypton, argon, xenon, nitrogen, or a mixture of gases. The type of gas depends on the spectrum desired. The gas absorbs the radiation emitted by the source and then emits its characteristic ultraviolet spectrum. The ultraviolet light is passed from the housing through suitable windows constructed of lithium fluoride, calcium fluoride or sodium bromide or any other ultraviolet transmitting material. The window material depends on the region of the spectrum produced by the gas one desires to isolate. Obviously, the housing must be vacuum tight, the radiation produced by the source must not be transmitted through the housing walls and the output depends on the amount of radiation, source and gas filling.

Now referring to the drawing, there is shown by illustration an ultraviolet lamp made in accordance to this invention. As shown the device includes a cylindrical housing 10 with walls of sufficient thickness to prevent passage of radiation from a radioactive source material 11 of iron 55, strontium 90, or any other suitable source for producing X-rays, beta or alpha radiation. The radioactive source material may be in the form of a metal disk, a compound of the material, an enclosure containing powders of the material, or powders of a compound of the material. The source material is secured in a cylindrical cavity 12 of a removable plug 13 which is secured to the housing 10 by suitable threads 14. The radioactive source is secured to the plug by any suitable means and therefore can be handled without any danger to personnel. As such, the radioactive source material can be secured to the plug in a shielded area and the plug screwed into the housing or removed therefrom as needed. Since the radioactive source is placed in a cavity in the plug the sides of the plug opposite the radioactive source provide a radiation shield, also, the housing wall in the vicinity of the radioactive source is thicker than the walls a distance from the source. This structure provides the greatest protection where needed and the thinner walls cut down on the weight. The walls may be made of any well known material compatible with the radioactive source material. The housing is provided with a window 15 in the end directly opposite the radioactive source material and a window 16 in the side wall at the thin walled portion of the housing. The windows may be made of any suitable material for passing ultraviolet light of the desired spectrum range. Such material may be lithium fluoride, calcium fluoride, or sodium bromide or any other similar material.

The housing is provided with an evacuating and filling valve 17 which is used to evacuate the housing after the radioactive source has been admitted and to admit into the tube a gas 18 at a pressure which allows maximum absorption of the radiation emitted by the radioactive source material, a suitable gas being helium, hydrogen, krypton, argon, xenon, nitrogen, or any other well known gas which produces ultraviolet spectrum when excited.

A suitable ultraviolet lamp of the present invention can be made with a housing having about a one inch inside diameter and a thickness of about ½ inch in the area opposite the radioactive source material. The upper portion of the housing is about ¼ inch thick and contains therein the evacuating and gas filling valve, a calcium fluoride window in the end opposite the radioactive source and a lithium fluoride window along the side wall. A radioactive source material of about ½ curie of strontium 90 is secured in the cavity 12 and with a gas filling of about ½ atmosphere of helium and about 3 mm. of hydrogen the tube will produce a strong ultraviolet light source through the windows. The beta rays emitted by the strontium 90 are absorbed by the gaseous mixture which emits its characteristic ultraviolet spectrum through windows 15 and 16. Since strontium 90 has a half-life of about 25 years the tube will produce an ultraviolet source for a long period of time. A suitable cover can be placed over either of each of the windows to block the ultraviolet light as desired.

The ultraviolet tube of the present invention is portable, of light weight and as such can be used for photochemical and spectroscopic experiments, as ultraviolet lamps for detection purposes or for calibration of ultraviolet detectors. Further, this tube can be used in upper air research by astronauts or by rocket launched vehicles, for detection purposes, or for quantitative or qualitative studies of planetary atmospheres. Since the tube has its own source it will be long lasting, accurate, stable, and due to its lightweight construction, is ideal for rocket launched vehicles.

Obviously many modifications and variations of the present invention are possible in the light of the above teachings, by use of different radioactive source materials and different gas mixtures. It is therefore to be understood that within the scope of the appended claims the invention may be practiced otherwise than as specifically described.

What is claimed is:
1. A portable ultraviolet lamp which comprises an elongated housing made of a radiation absorptive material, a removable radioactive material holding means secured in one end of said housing, a radioactive material selected from a group comprising strontium 90 and iron 55 secured by said holding means, at least one ultraviolet transmissive window secured in the end of said housing opposite said radioactive material, an evacuation and gas admittance valve secured to said housing, and a gaseous filling in said housing between said radioactive material and said window, said gaseous filling adapted to absorb radiation emitted by said radiation material and to emit its characteristic ultraviolet spectrum through said window.

2. A portable ultraviolet lamp as claimed in claim 1 wherein the gas admitted into said housing is selected from a group consisting of helium, hydrogen, krypton, argon, xenon, and nitrogen.

3. A portable ultraviolet lamp which comprises a cylindrical elongated housing made of a radiation absorptive material, a removable plug secured in the end of said housing, a radioactive source of strontium 90 secured to said plug within said housing, at least one ultraviolet transmissive window secured in the end of said housing opposite from said strontium 90, an evacuation and gas admittance valve secured to said housing, and a gaseous mixture of helium at about one-half atmosphere of pressure and hydrogen at about three millimeters of mercury admitted into said housing between said strontium 90 and said window whereby said gaseous mixture absorbs radiation emitted from said strontium 90 and emits its characteristic ultraviolet spectrum through said window.

4. A portable ultraviolet lamp as claimed in claim 3 wherein said radioactive source is iron 55.

References Cited by the Examiner

UNITED STATES PATENTS

| | | | |
|---|---|---|---|
| 2,884,529 | 4/59 | Eggler et al. | 250—71.5 |
| 3,005,102 | 10/61 | MacHutchin et al. | 313—59 |

RALPH G. NILSON, *Primary Examiner.*